US007929515B2

(12) United States Patent
Puthenpura et al.

(10) Patent No.: US 7,929,515 B2
(45) Date of Patent: Apr. 19, 2011

(54) METHOD AND APPARATUS FOR DESIGNING RADIO ACCESS NETWORKS INCLUDING BROADBAND WIRELESS LINKS

(75) Inventors: Sarat Puthenpura, Berkeley Heights, NJ (US); David G. Belanger, Hillsborough, NJ (US); Sam Parker, Cranbury, NJ (US); Wenjie Zhao, Princeton, NJ (US); Arun Jotshi, Lake Hiawatha, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 85 days.

(21) Appl. No.: 12/337,915

(22) Filed: Dec. 18, 2008

(65) Prior Publication Data

US 2010/0157808 A1 Jun. 24, 2010

(51) Int. Cl.
*H04L 12/28* (2006.01)
*H04W 4/00* (2009.01)
*H04J 3/16* (2006.01)
*H04J 3/22* (2006.01)

(52) U.S. Cl. ......... 370/351; 370/328; 370/338; 370/465
(58) Field of Classification Search .................. 370/252, 370/254, 255
See application file for complete search history.

(56) References Cited

U.S. PATENT DOCUMENTS

| | | | |
|---|---|---|---|
| 6,353,742 B1 * | 3/2002 | Bach | 455/453 |
| 6,363,334 B1 * | 3/2002 | Andrews et al. | 703/13 |
| 6,542,469 B1 * | 4/2003 | Kelley et al. | 370/238 |
| 6,577,621 B1 * | 6/2003 | Balachandran | 370/352 |
| 6,603,753 B1 * | 8/2003 | Bedekar et al. | 370/335 |
| 6,760,310 B1 | 7/2004 | Sofman | |
| 6,865,169 B1 * | 3/2005 | Quayle et al. | 370/335 |
| 7,263,069 B2 | 8/2007 | Yegenoglu | |
| 7,388,842 B1 * | 6/2008 | Applegate et al. | 370/238 |
| 7,433,315 B2 * | 10/2008 | Bhatia et al. | 370/237 |
| 2004/0062214 A1 * | 4/2004 | Schnack et al. | 370/315 |
| 2007/0110005 A1 * | 5/2007 | Jin et al. | 370/335 |
| 2008/0159212 A1 * | 7/2008 | Zhang et al. | 370/329 |
| 2008/0219281 A1 * | 9/2008 | Akin et al. | 370/419 |
| 2009/0147690 A1 * | 6/2009 | King | 370/245 |
| 2009/0180428 A1 * | 7/2009 | Viswanath | 370/328 |
| 2009/0323621 A1 * | 12/2009 | Touboul et al. | 370/329 |

OTHER PUBLICATIONS

ILOG CPLEX® "The World's Leading Mathematical Programming Optimizers," Data Sheet, 2 pages, downloaded Nov. 6, 2008 from URL: http://www.ilog.com/products/cplex/.
ILOG OPL Development Studio, "Harness the Power of Optimization," Data Sheet, 3 pages, downloaded Dec. 1, 2008 from URL: http://www.ilog.com/products/oplstudio/.
Wikipedia, "Linear Programming," definition, 11 pages, downloaded Nov. 3, 2008 from URL: http://en.wikipedia.org/wiki/Linear_program.

* cited by examiner

*Primary Examiner* — Warner Wong
(74) *Attorney, Agent, or Firm* — Zagorin O'Brien Graham LLP

(57) ABSTRACT

A technique for reducing costs associated with a radio access network of a mobile telecommunications network includes configuring the radio access network using a linear programming model of the radio access network subject to constraints. The technique includes selecting cellular sites and hub locations of the radio access network to be connected by broadband wireless links based on the linear programming model and constraints. In at least one embodiment of the invention, a method of designing a radio access network of links between a cellular site and a core network includes selecting at least one first link of the radio access network to be at least one first wireless link at least partially based on a linear programming model of the radio access network. The method includes configuring an output device of a computer system to indicate the selection.

22 Claims, 8 Drawing Sheets

| Market | Demand (T1s) | Towers | Type 1 BBW Links (DS3) | Type 2 BBW Links (OC3) | Type 3 BBW Links (2*OC3) | Hubs | Capital to existing leased MRC ratio | New MRC to existing leased MRC ratio | Payback Months |
|---|---|---|---|---|---|---|---|---|---|
| ALABAMA MISSISSIPPI LOUISIANA | 6 | 1 | 1 | 0 | 0 | 1 | 14.33 | 0.10 | 15.9 |
| ARKANSAS OKLAHOMA | 150 | 18 | 17 | 1 | 0 | 2 | 21.80 | 0.04 | 22.6 |
| AZ NM | 704 | 100 | 99 | 1 | 0 | 7 | 19.30 | 0.10 | 21.4 |
| CO UT WY MT SO ID | 1218 | 138 | 137 | 1 | 0 | 11 | 22.40 | 0.08 | 24.5 |
| E PA S NJ DE | 4220 | 529 | 529 | 0 | 0 | 29 | 21.12 | 0.10 | 23.3 |
| GEORGIA | 52 | 2 | 1 | 1 | 0 | 2 | 11.88 | 0.08 | 12.9 |
| HAWAII | 156 | 18 | 17 | 0 | 0 | 1 | 25.93 | 0.12 | 29.5 |
| ILLINOIS WISCONSIN | 44 | 10 | 10 | 0 | 0 | 6 | 24.28 | 0.13 | 27.8 |
| LOS ANGELES | 1926 | 187 | 185 | 2 | 0 | 25 | 24.53 | 0.09 | 26.9 |
| MICHIGAN INDIANA | 64 | 13 | 13 | 0 | 0 | 6 | 24.57 | 0.10 | 27.2 |
| MISSOURI KANSAS | 36 | 7 | 7 | 0 | 0 | 2 | 20.79 | 0.09 | 22.9 |
| ND SD NE MN IA | 798 | 95 | 94 | 0 | 1 | 10 | 21.28 | 0.10 | 23.8 |
| NEW ENGLAND | 3260 | 411 | 401 | 10 | 0 | 24 | 17.45 | 0.09 | 19.2 |
| NORTH CAROLINA SOUTH CAROLINA | 192 | 27 | 27 | 0 | 0 | 4 | 20.59 | 0.09 | 22.6 |
| NORTH FLORIDA | 2148 | 184 | 183 | 0 | 1 | 11 | 23.04 | 0.09 | 25.4 |
| NORTH TEXAS | 1866 | 219 | 219 | 0 | 0 | 15 | 19.10 | 0.06 | 20.3 |
| NYC NNJ | 9294 | 919 | 915 | 3 | 1 | 51 | 20.36 | 0.12 | 23.1 |
| OHIO WESTERN PENNSYLVANIA | 1890 | 255 | 252 | 2 | 1 | 23 | 21.85 | 0.08 | 23.8 |
| SAN DIEGO LAS VEGAS | 750 | 41 | 39 | 0 | 2 | 5 | 24.61 | 0.11 | 27.6 |
| SAN FRANCISCO SACRAMENTO | 160 | 23 | 23 | 0 | 0 | 7 | 15.93 | 0.06 | 17.0 |
| SEATTLE OREGON NO ID | 2950 | 299 | 295 | 2 | 2 | 29 | 20.92 | 0.09 | 23.1 |
| SOUTH TEXAS | 546 | 73 | 73 | 0 | 0 | 14 | 21.59 | 0.06 | 23.1 |
| TENNESSEE KENTUCKY | 78 | 10 | 10 | 0 | 0 | 5 | 21.73 | 0.07 | 23.2 |
| UPSTATE NY | 880 | 102 | 96 | 6 | 0 | 6 | 19.42 | 0.09 | 21.3 |
| VA WVA | 316 | 48 | 47 | 1 | 0 | 7 | 16.74 | 0.10 | 18.6 |
| WASHINGTON D C MARYLAND | 5064 | 693 | 692 | 0 | 1 | 40 | 14.02 | 0.08 | 15.2 |
| | 38,768 | 4,422 | 4,382 | 31 | 9 | 343 | 19.07 | 0.09 | 21.0 |

FIG. 5

METHOD AND APPARATUS FOR DESIGNING RADIO ACCESS NETWORKS INCLUDING BROADBAND WIRELESS LINKS

BACKGROUND

1. Field of the Invention

This invention relates to telecommunications networks and more particularly to techniques for designing radio access networks.

2. Description of the Related Art

In a typical mobile telecommunications network, user equipment (e.g., a mobile communications device) is connected to a portion of the core network (e.g., a Mobile Telephone Switching Office, i.e., MTSO) by a radio access network. The radio access network includes cellular sites and links between those cellular sites and MTSOs, data centers, and other network locations. A backhaul portion of the network connects the cellular sites to the core network. A mobile telecommunications network operator may operate in areas where local access networks are owned by other telecommunication providers. In these areas, the mobile telecommunications network operator typically leases transport facilities from incumbent local access providers. The cost of leasing those facilities or installing direct fiber communications facilities to link the cellular sites to the core network is a substantial component of a cost of operating a radio access network by the mobile telecommunications network operator.

SUMMARY

A technique for reducing costs associated with a radio access network of a mobile telecommunications network includes configuring the radio access network using a linear programming model of the radio access network subject to constraints. The technique includes selecting cellular sites and hub locations of the radio access network to be coupled by broadband wireless links based on the linear programming model and constraints. In at least one embodiment of the invention, a method of designing a radio access network of links between a cellular site and a core network includes selecting at least one first link of the radio access network to be at least one first wireless link at least partially based on a linear programming model of the radio access network. The method includes configuring an output device of a computer system to indicate the selection. In at least one embodiment, the at least one first wireless link is a broadband wireless link having a frequency range in a microwave frequency band.

In at least one embodiment of the invention, an apparatus includes a computer program product encoded in one or more computer-readable media, the computer program product comprising a first sequence of instructions executable to select at least one first link of a radio access network of links between a cellular site and a core network to be at least one first wireless link at least partially based on a linear programming model of the radio access network. In at least one embodiment, the computer program product further comprises a display sequence of instructions executable to configure an output device of a computer system to indicate the selection of the first sequence of instructions.

BRIEF DESCRIPTION OF THE DRAWINGS

The present invention may be better understood, and its numerous objects, features, and advantages made apparent to those skilled in the art by referencing the accompanying drawings.

FIG. 5 illustrates an exemplary report generated by the technique of FIG. 3 consistent with at least one embodiment of the invention.

The use of the same reference symbols in different drawings indicates similar or identical items.

DESCRIPTION OF THE PREFERRED EMBODIMENT(S)

Figure 1:
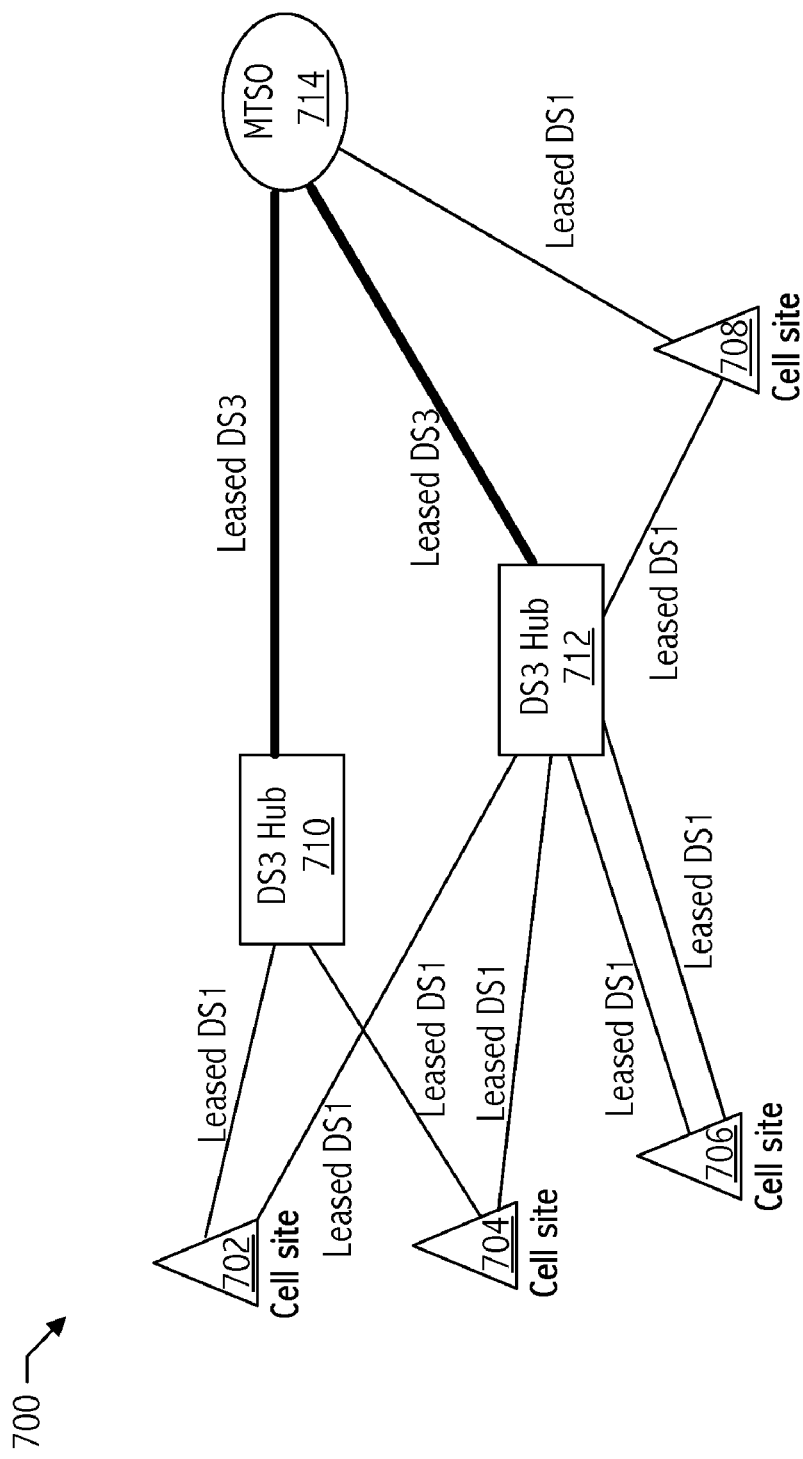
FIG. 1 illustrates an exemplary mobile telecommunications network portion including leased facilities.

Referring to FIG. 1, an exemplary mobile telecommunications network (e.g., mobile telecommunications network 700) includes cell sites (e.g., cell sites 702, 704, . . . , 708) connected to a core network (e.g., MTSO 714) using leased backhaul facilities (e.g., Leased DS1 lines, hub 710, hub 712, and Leased DS3 lines) as part of the radio access network. Broadband wireless links may be included in the radio access network as an alternative to leasing backhaul facilities or installing direct fiber communications facilities to connect the cellular sites to the core network. As referred to herein, a broadband wireless link is a low-power, point-to-point link implemented through the atmosphere in a microwave frequency band. Broadband wireless links have relatively low capital costs and are relatively easy to deploy (e.g., as compared to installation of direct fiber facilities). However, selection of cellular sites and hub locations of a radio access network to be linked by broadband wireless technology is a complex design problem that impacts the performance and cost structure of a resulting radio access network, thereby influencing the overall financial metrics and market competitiveness of the associated mobile telecommunications network operator. As the number of cellular sites and potential hub locations increases, design improvements and/or design optimality become practically impossible to determine using manual methods.

Figure 2:
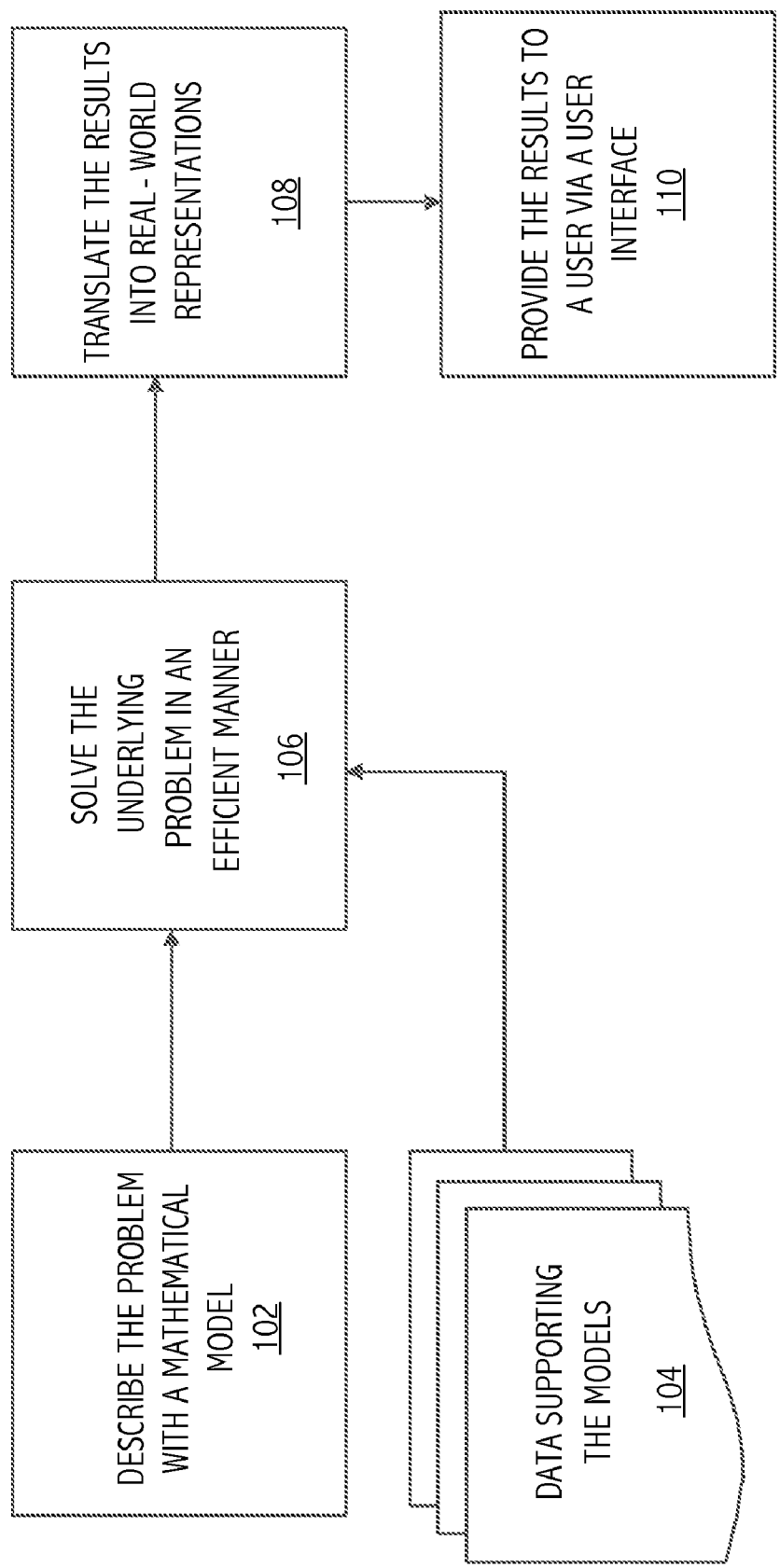
FIG. 2 illustrates information and control flows of a technique for solving a design problem consistent with at least one embodiment of the invention.

Referring to FIG. 2, a general technique for solving a complex design problem includes modeling the problem mathematically (102). Data supporting that mathematical model is applied to the mathematical model and techniques are used to solve the problem (106). The solution is then translated into real-world representations (108) and provided to a user, e.g., in a graphical or tabular format via a user interface (110). The user (e.g., a radio access network planner) may implement the solution and/or iteratively apply the mathematical model to data and results to solve the design problem. For example, the user may feed back results into the model and/or data and then solve the updated problem to obtain updated results. In addition, as conditions change over time, the design problem may be re-evaluated to account for updated conditions and an implementation based on the solution may be updated accordingly.

Figure 3:
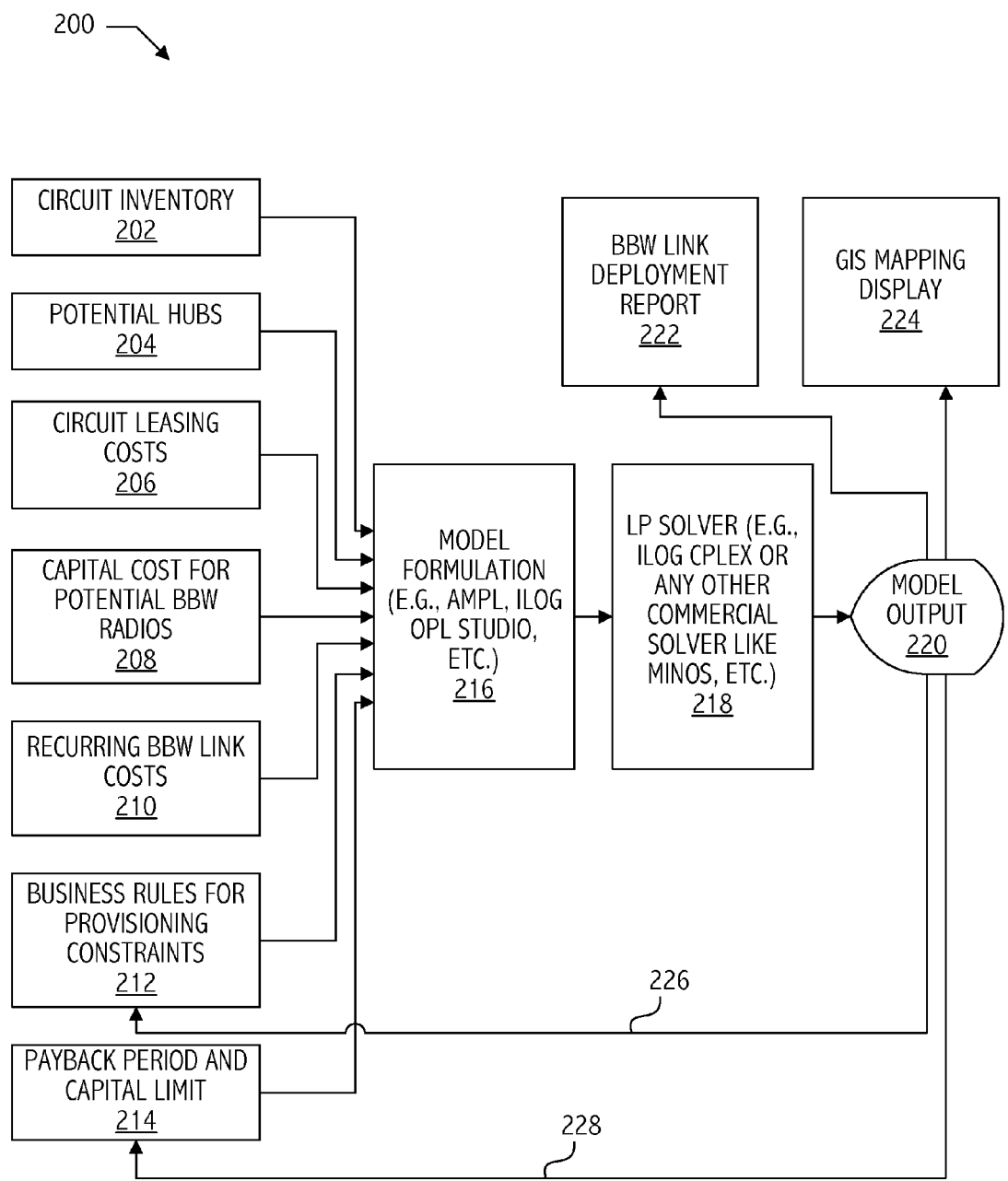
FIG. 3 illustrates information and control flows of a technique for designing and updating a radio access network consistent with at least one embodiment of the invention.
Figure 4:
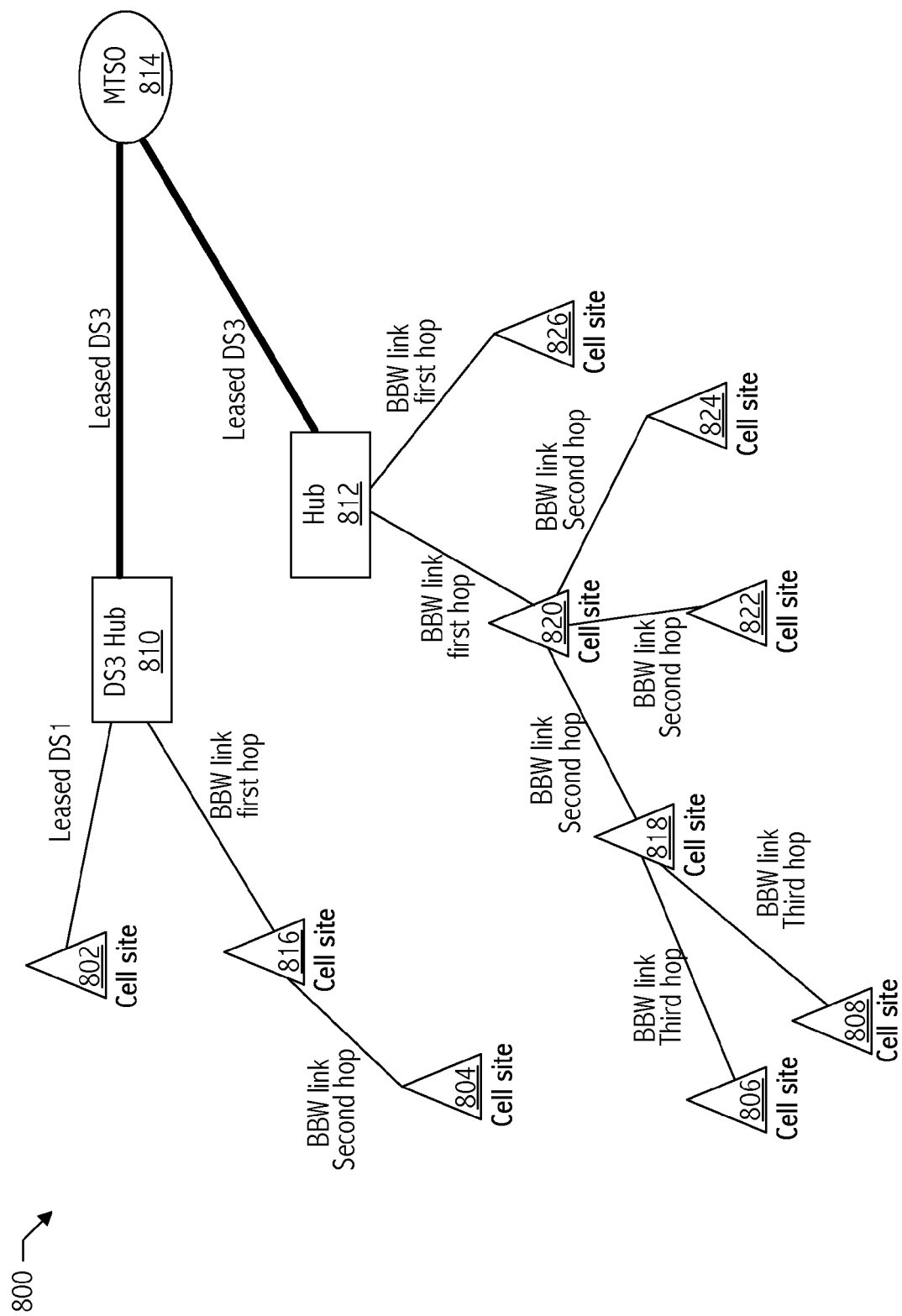
FIG. 4 illustrates an exemplary mobile telecommunications network portion designed using the technique of FIG. 3 consistent with at least one embodiment of the invention.

Referring to FIG. 3, technique 200 performs design analysis of a radio access network including formulation of a linear programming model of the radio access network having an objective of minimizing a total cost of connecting cellular sites to hub locations either via broadband wireless links or existing leased lines over a given period of time. In general, a linear programming model is a mathematical technique for optimizing a linear objective function subject to linear equality and linear inequality constraints. If all of the unknown variables are required to be integers, then the problem may be referred to as an integer programming problem or an integer linear programming problem. Algorithms for solving integer linear programming problems known in the art include cutting-plane method, branch and bound, branch and cut, branch and price, and in some cases delayed column generation. Solvers and scripting (programming) languages used to solve integer linear programming problems include e.g., AIMMS, AMPL, ILOG CPL Studio, Cassowary constraint solver, SYMPHONY, CPLEX, GAMS, GNU Linear Programming-Kit, IMSL Numerical Libraries, Lingo, Matlab, Mathematica, MINTO, MOSEK, OptimJ, Qoca, R-Project, SAS, and Xpress-MP. Note that the invention disclosed herein is not limited thereto. Other suitable algorithms, solvers and scripting languages known in the art may be used.

Technique 200 formulates the integer programming model based on data associated with the radio access network. For example, a radio access network may be modeled based on circuit inventory 202, potential hubs 204, circuit leasing costs 206, capital costs for potential broadband wireless facilities 208, ongoing maintenance costs 210, business rules for provisioning constraints 212, and payback period and capital limits 214 using any suitable programming language. As referred to herein, a payback period is the period of time required to recover the capital investment of installing particular broadband wireless facilities based on recurring charges associated with the particular broadband wireless facilities and recurring charges of leased links that are replaced by those particular broadband wireless facilities. Constraints on the integer programming model may include a specified payback period, limits on capital investment, required quality of service for particular broadband wireless links, redundancy requirements, or other suitable constraints. Capital cost for the replacement may include costs of equipment, labor, etc. Recurring costs associated with broadband wireless links may include costs associated with obtaining roof rights, maintenance, etc.

In at least one embodiment, technique 200 formulates the model (216) using a scripting language, e.g., AMPL A Modeling Language for Mathematical Programming, or other suitable scripting language described above, and/or a commercial model development tool, e.g., ILOG Optimization Programming Language Development Studio, or by using other suitable modeling techniques. The model is formulated to optimally connect cellular sites to a core network using links and hub locations with the objective of minimizing the total cost over a given period of time for the resulting radio access network. The resulting radio access network realizes monthly savings after a payback period by replacing leased circuits with broadband wireless links.

In at least one embodiment of technique 200, the model is an integer programming model based on a three-hop design. As referred to herein, a hop is an individual segment or individual leg of multiple segments or legs that connect two network locations. For example, a first hop links particular cellular sites to first hub locations using broadband wireless links. A second hop uses the cellular sites that are identified in the first hop, as hub locations for second tier cellular sites that are coupled to the first hop cellular sites by broadband wireless links. A third hop uses the cellular sites that are identified in the second hop, as hub locations for third tier cellular sites that are connected to the second tier cellular sites by broadband wireless links. In at least one embodiment of technique 200, additional hops are used. However, an increased number of hops may impact reliability of the resulting radio access network or may require additional redundancy, which increases costs of the resulting radio access network. For example, if one broadband wireless site fails in a chain, the entire chain may be disconnected, thereby impacting quality of service if sufficient redundancy is not implemented.

An exemplary integer programming model subject to constraints uses the following variables:

J is the set of cellular sites (i.e., towers);
JJ is the set of all potential tower-to-tower combinations;
P is the set of all hubs;
JP is the set of all potential combinations of towers and hubs;
COMB={JJ union JP} is the set of all possible combinations;
$D_j$ is the demand (i.e., traffic) associated with tower j;
L is the level of broadband wireless link with different capacities, e.g., Digital Signal 3 (i.e., DS3), Optical Carrier 3 (i.e., OC3), 2*OC3, etc.;
$CapMcr_l$ is the capacity of a broadband wireless link at each level, e.g., 28 T1, 84 T1, 168 T1, etc.;
$McrLnkCst_{jkl}$ is the capital cost of installing a broadband wireless link between a tower j and a tower or hub k of capacity l;
$CrntCost_j$ is the current leased line cost for tower j;
$CF_p$ is the fixed capital cost at a hub p;
$MRC_p$ is the monthly recurring cost at a hub p;
$CV_{jk}$ is the variable capital cost for a broadband wireless link between tower j and tower or hub k;
$MRC_{jk}$ is the monthly recurring cost for a broadband wireless link;
d is the number of disjoint paths needed;
$Hop_j$ is the limit on the number of hops for tower j;
$Limit_p$ is the limit on the number of broadband wireless links at a hub p;
$Limit_J$ is the limit on the number of broadband wireless links at a tower j;
payback is the payback period in months.

The exemplary integer programming model has an objective of minimizing total cost of connecting cellular sites to hub locations either via broadband wireless links or existing leased lines over a given period of time, as illustrated in Equation 1:

$$\text{Minimize} \sum_j (1 - zz_j) * CrntCost_j + \qquad (1)$$

$$\sum_j \sum_k \sum_l (M_{jkl} * McrLnkCst_{jkl} / \text{payback}) +$$

$$\sum_j \sum_k z_{jk} * ((CV_{jk} / \text{payback}) + MRC_{jk}) +$$

$$\sum_p y_p * ((CF_p / \text{payback}) + MRC_p)$$

where
x[i,p,j,k] indicates whether the path from cellular site i to hub p uses link (j,k) between a cellular tower j and a tower or hub k;

y[p] indicates whether or not hub p is used;

z[j,k] indicates whether a broadband wireless link between cellular tower j and tower or hub k is activated;

zz[i] indicates whether a broadband wireless link is used for cellular site i (e.g., to help the branch and bound procedure for solving the integer programming problem);

MW[j,k] indicates the total capacity of broadband wireless links between cellular site j and cellular site or hub k;

M[j,k,l] indicates a broadband wireless link between cellular site j and cellular site or hub k of capacity level l.

In at least one embodiment of technique 200, the linear programming model of Equation 1 is constrained by the following constraints of Equations 2-16:

$$MW_{jk} = \sum_{i}\sum_{p} x_{ipjk} * D_i \forall\, j, k \in COMB \tag{2}$$

$$MW_{jk} \leq \sum_{l} M_{jkl} * CapMcr_l \forall\, j, k \in COMB \tag{3}$$

$$\sum_{l} M_{jkl} \geq z_{jk} \forall\, j, k \in COMB \tag{4}$$

$$M_{jkl} \leq z_{jk} * 9999999 \forall\, j, k \in COMB, l \in L \tag{5}$$

$$zz_j \leq \sum_{k:(j,k)\in COMB} z_{jk} \forall\, j \in J \tag{6}$$

$$zz_j \geq z_{jk} \forall\, j, k \in COMB \tag{7}$$

$$\sum_{j}\sum_{\substack{k:(j,k)\in JP \\ k\neq p}} x_{ipjk} = 0 \forall\, i \in J, p \in P \tag{8}$$

$$\sum_{p}\sum_{k:(i,k)\in COMB} x_{ipik} >= d \forall\, i \in J \tag{9}$$

$$\sum_{p}\sum_{j:(j,p)\in COMB} x_{ipjp} >= d \forall\, i \in J \tag{10}$$

$$\sum_{j} x_{ipjw} = \sum_{k} x_{ipwk} \forall\, i \in J, p \in P, w \in J : w \neq i \tag{11}$$

$$\sum_{p} x_{ipjk} \leq 1 \forall\, i \in J, (j,k) \in COMB \tag{12}$$

$$\sum_{i}\sum_{j}\sum_{k:(j,k)\in COMB} x_{ipjk} \leq y_p * 9999999 \forall\, p \in P \tag{13}$$

$$\sum_{j:(j,p)\in JP} z_{jp} \leq Limit_P \forall\, p \in P \tag{14}$$

$$\sum_{j:(j,k)\in COMB} z_{jk} \leq Limit_J \forall\, j \in J \tag{15}$$

$$\sum_{j}\sum_{k:(j,k)\in COMB} x_{ipjk} \leq Hop_i \forall\, i \in J, p \in P \tag{16}$$

The constraints of Equations 2 and 3 ensure that a broadband wireless link between cellular site j and cellular site or hub k can handle the demand at that location. The constraints of Equations 4 and 5 establish whether a broadband wireless link between a first cellular site and a second cellular site or hub is activated. The constraints of Equations 6 and 7 establish whether a cellular site uses broadband wireless facilities. The constraint of Equation 8 ensures that a path from a cellular site j to hub p will not include a link that goes to another hub p' first. The constraints of Equations 9, 10, and 11 are flow constraints that ensure that there are d paths for a cellular site i going to hubs. The constraint of Equation 12 ensures that the d paths are disjoint. The constraint of Equation 13 ensures that hub p is activated if a cellular site is linked to it. The constraints of Equations 14 and 15 ensure that the total number of broadband wireless links at a particular hub or cellular site does not exceed a predetermined limit. The constraint of Equation 16 limits the path from a cellular site to a hub to a particular number of hops.

A resulting integer programming model and associated constraints are provided to a linear programming solver (218), e.g., ILOG CPLEX, MINOS, or other suitable linear programming solver described above that provides model output 220. The solver determines a minimum of the linear objective function, if one exists. Model outputs may be reported to a user using any suitable technique. In at least one embodiment, technique 200 provides the outputs to a user as broadband wireless link deployment report 222. In at least one embodiment, technique 200 provides the outputs to a geographic information system 224, which maps the display. In at least one embodiment of technique 200, model outputs may be fed to an output device, which may be a computer-readable medium (e.g., memory device), a visual display terminal, an audio output device (e.g., speaker), or other suitable device configured to receive the results and make those results accessible to a user. As used herein, a computer-readable medium includes at least disk, tape, or other magnetic, optical, semiconductor (e.g., flash memory cards, ROM), or electronic medium.

In at least one embodiment of technique 200, model outputs may be fed back into the model formulation (e.g., feedback 226 and feedback 228). For example, model outputs may indicate that a large number of microwave links are connected to certain hubs. A user may determine that such a scenario has potential microwave frequency interference issues. In response, the user feeds back, e.g., via a user interface, a reduced value of the parameter $Limit_P$ for the concerned hubs and solves the revised design problem again.

In at least one embodiment of technique 200, model 216 may be updated periodically to reflect changes in demand, demographics of a particular market, changes in technology, etc. A resulting radio access network may be periodically adjusted based on technique 200 to reflect those changes. For example, new lines may be implemented to include broadband wireless facilities, leased lines, or direct fiber facilities based on results of technique 200 and/or existing leased lines may be replaced by broadband wireless facilities based on those results.

The output of technique 200 may be used by mobile telecommunications network planners to revise an existing network. For example, referring to FIG. 6, mobile telecommunications network 700 may replace some of the leased lines of FIG. 1 with broadband wireless links in place of existing leased lines. Cell site 826 is coupled to hub 812, using a single hop broadband wireless link. Cell site 804 is connected to hub 810 using broadband wireless links having two-hops (e.g., a first hop being between cell site 816 and hub 810, and a second hop being between cell site 804 and cell site 816). Similarly, cell sites 822 and 824 are connected to hub 812 using broadband wireless links having two-hop designs (e.g., cell site 820 is connected to hub 812 by the first hop and cell sites 822 and 824 are connected to cell site 820 by respective second hops). Cell sites 806 and 808 are connected to hub 812 using a three-hop design, e.g., cell site 820 is connected to hub 812 with a first hop broadband wireless link, cell site 818 is connected to cell site 820 by a second hop broadband wireless link, and cell sites 806 and 808 are each connected to cell site 818 by respective third hop broadband wireless links. Meanwhile, cell site 802 is coupled to hub 810 by a leased line and hubs 810 and 812 are connected to MTSO 814 by leased lines.

An exemplary broadband wireless deployment report 300 is illustrated in FIG. 5. Note that the input and output data categories of report 300 are exemplary only. A report consistent with the techniques described herein may include other types and combinations of input and output data. For an individual market (e.g., groups of geographical regions), report 300 summarizes the portion of demand and cellular towers associated with that market that are identified as candidates for replacement using broadband wireless links. Report 300 also summarizes outputs of technique 200 for individual markets: a number of each type of broadband wireless link being used to replace the leased lines (e.g., DS3, OC3, 2*OC3), a number of broadband wireless hubs used to replace the leased lines, the fixed capital investment to replace the leased lines with broadband wireless equipment as a multiple of existing leased cost for the demand identified, a monthly recurring cost associated with the broadband wireless equipment as a multiple of existing leased cost for the demand identified, and a number of months required to achieve payback for the fixed capital investment.

For example, in the New York City/New Jersey market, a telecommunications carrier can replace 9,294 leased lines from another service provider as part of a radio access network associated with 919 cellular towers. Technique 200 analyzes the radio access network for the New York City/New Jersey market and determines that those leased lines can be replaced by 915 DS3 broadband wireless links, 3 OC3 broadband wireless links, and one 2*OC3 broadband wireless link. Those broadband wireless links connect to 51 hubs. The ratio of capital investment associated with the broadband wireless equipment to existing leased monthly cost is 20.36. However, the monthly recurring cost is reduced to only 12% of existing leased monthly cost (i.e., the monthly recurring cost is reduced by 88%). If the telecommunications network operator replaces those leased lines, the telecommunications network operator will achieve payback in 23.1 months. That is, the telecommunications network operator will have saved an amount equivalent to the cost of the capital investment within 23.1 months and then will save 88% of the existing monthly cost every month thereafter.

Figure 6:
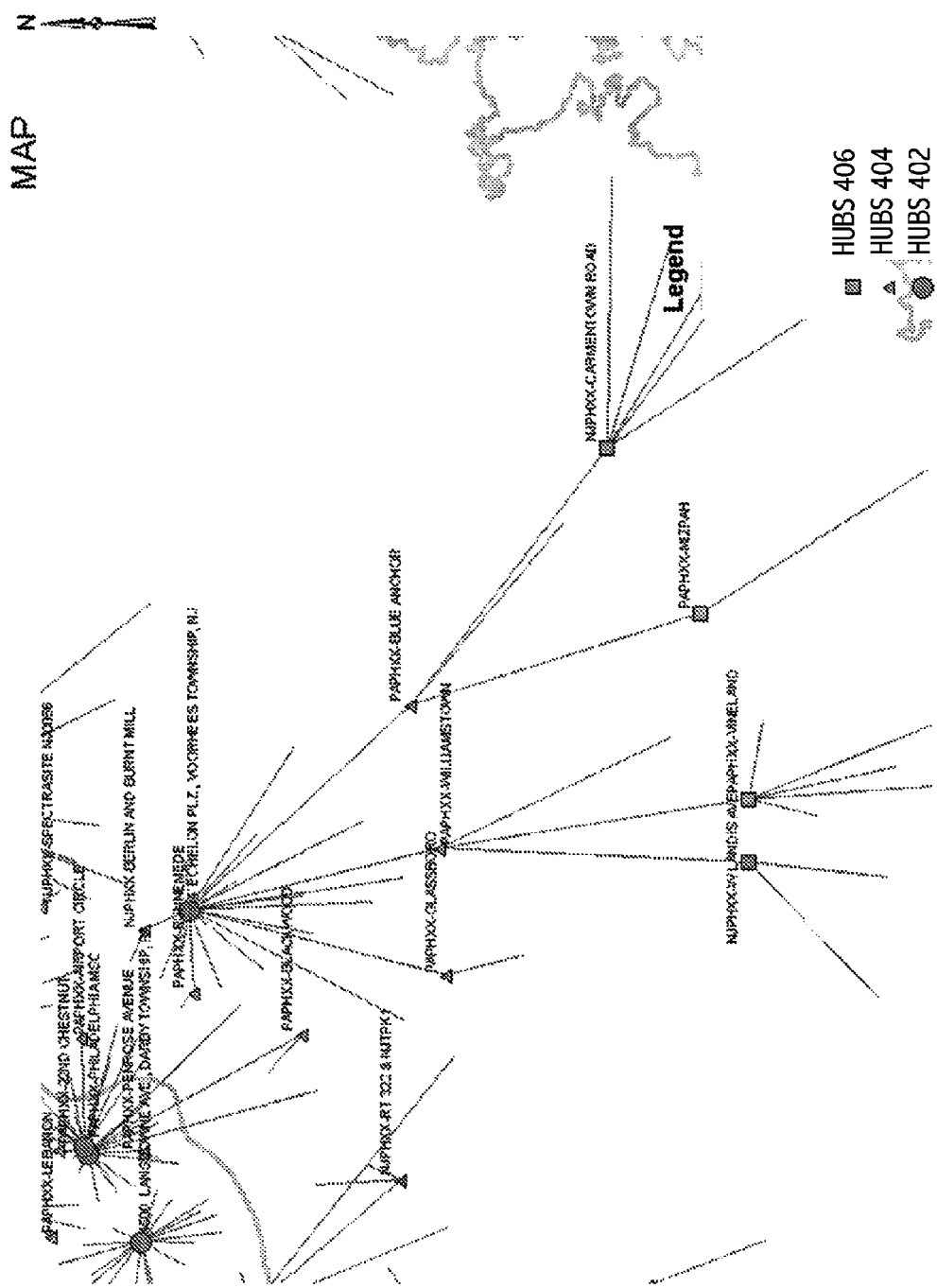
FIG. 6 illustrates an exemplary radio access network topology generated by the technique of FIG. 3 consistent with at least one embodiment of the invention.

An exemplary geographic information system mapping of broadband wireless hubs and links for a radio access network designed by the technique 200 of FIG. 3, is illustrated for an exemplary New York City/New Jersey market in FIG. 6. Hubs 402 indicate the hubs identified in a first hop. Hubs 404 indicate the hubs identified in a second hop. Hubs 406 indicate the hubs identified in a third hop.

Figure 7:
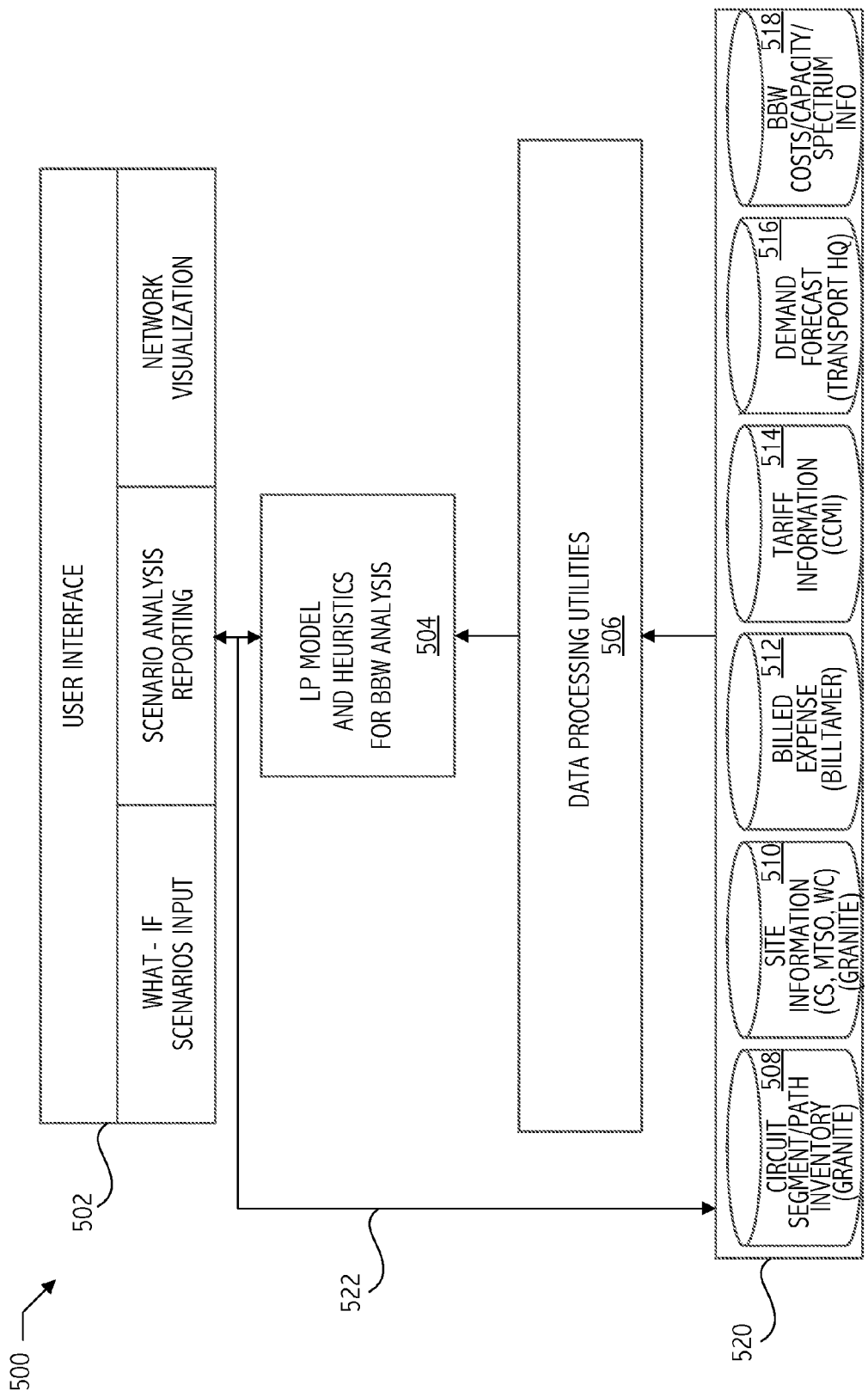
FIG. 7 illustrates an exemplary apparatus for implementing the technique of FIG. 3 consistent with at least one embodiment of the invention.
Figure 8:
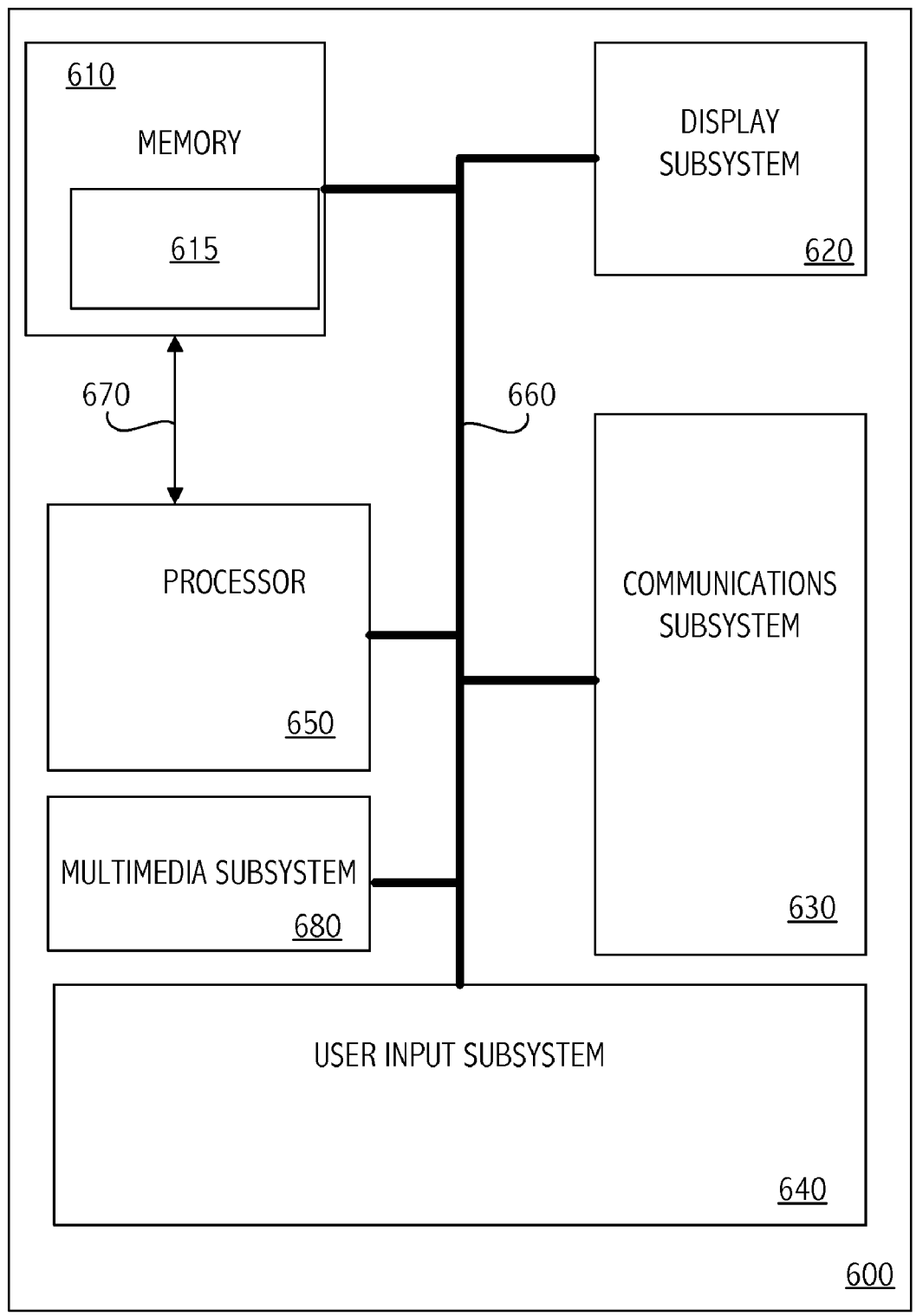
FIG. 8 illustrates an exemplary apparatus for implementing the technique of FIG. 3 consistent with at least one embodiment of the invention.

Referring to FIG. 7, in at least one embodiment of technique 200, an apparatus (e.g., system 500) includes data feeds 520, data processing utilities 506, modeling and analysis tools 504, and user interface 502. Data feeds 520 include a circuit segment or path inventory data feed 508 and site information data feed 510, each of which may be implemented using a custom-designed software tool or other tool (e.g., a Granite system) that stores data related to radio access network inventory. Billed expense data feed 512 may include data generated by a tool that audits and analyzes telecommunications carrier access billing system bills (e.g., BillTamer). Tariff information data feed 514 may include data filed by telecommunication carriers with the Federal Communication Commission (FCC). Demand forecast data feed 516 includes data provided by regional engineers and headquarter transport staff for expected future demand growth. In addition, data feeds 520 include broadband wireless costs, capacity, and spectrum information data feed 518. Referring to FIGS. 7 and 8, in at least one embodiment of system 500, data feeds 520 include other combinations of data feeds. Data feeds 520 may be implemented in a computer-readable medium (e.g., memory 610 of FIG. 8) and fed to data processing utilities 506, which, in at least one embodiment of system 500 are implemented by software (e.g., instructions stored in memory portion 615) executing on a general purpose processor (e.g., processor 650 of data processing system 600).

Referring back to FIG. 7, data processing utilities 506 store results in memory or other computer-readable medium, which makes those results available for analysis tool 504. In at least one embodiment of system 500, analysis tool 504 includes software (e.g., instructions stored in memory portion 615) for applying a linear programming model and heuristics for broadband wireless analysis that executes on a general purpose processor (e.g., processor 650 of data processing system 600). The output data of analysis tool 504 is provided to user interface 502 (e.g., display subsystem 620 of FIG. 8), which reports the analysis on a graphical user interface, provides a visualization of a resulting network, or provides those output data in other suitable format(s). In at least one embodiment of system 500, data feeds 520 are updated with output 522 of analysis tool 504.

In addition, in at least one embodiment, user interface 502 receives inputs from a user and provides those data to analysis tool 504. For example, a user may provide a target payback period based on capital limits for one or more market analyses. The target payback period is applied to the radio access network (e.g., as part of the objective function of the linear programming model of the radio access network) and analysis tool 504 provides a radio access network design that includes broadband wireless links that achieves payback within the target payback period. Furthermore, users can specify many other parameters to the linear programming model e.g., forcing certain locations to be hubs (i.e., force some y[p] to be 1), limiting the maximum of broadband wireless links to a hub (i.e., Limit$_p$), changing various cost elements associated with broadband wireless equipment, or specifying other suitable parameters. Other scenarios that may be indicated by user input include changes to limits on a number of hops, changes to redundancy requirements, or changes to other business rules that are applied to the radio access network.

The description of the invention set forth herein is illustrative, and is not intended to limit the scope of the invention as set forth in the following claims. For example, while the invention has been described in an embodiment in which leased links are replaced with broadband wireless links, one of skill in the art will appreciate that the teachings herein can be utilized with other wireless links (e.g., other wireless technologies using frequency bands other than the microwave frequency band). Variations and modifications of the embodiments disclosed herein may be made based on the description set forth herein, without departing from the scope and spirit of the invention as set forth in the following claims.

What is claimed is:

1. A method of designing a radio access network of links between a cellular site and a core network comprising:
using a processor to select at least one first link of the radio access network to be at least one first wireless link at least partially based on a linear programming model of the radio access network, wherein the at least one first link is a leased, wireline link; and
replacing the at least one first link of the radio access network with the at least one first wireless link, wherein the replacing is at least partially based on a payback period associated with the replacement and a target payback period.

2. The method, as recited in claim 1, wherein the selecting comprises:
solving the linear programming problem on a computer system to select the at least one first link of the radio access network to be the at least one first wireless link at least partially based on the linear programming model of the radio access network and the payback period associated with replacement of the at least one first link with the at least one first wireless link.

3. The method, as recited in claim 2, wherein the linear programming model of the radio access network includes a linear objective function of costs associated with wireline links between cellular sites and the core network and costs associated with wireless links between cellular sites and the core network.

4. The method, as recited in claim 3, wherein the linear programming model of the radio access network includes radio access network constraints including one or more of a redundancy requirement, a limit to a number of hops between a cellular site and a hub, a limit to a number of wireless links per hub, and a limit to a number of wireless links per cellular site.

5. The method, as recited in claim 3, wherein solving the linear programming problem comprises:
determining a minimum cost of operating the radio access network over a target time period by determining a minimum of the linear objective function subject to radio access network constraints,
wherein the selecting the at least the first link is based on the minimum of the linear objective function.

6. The method, as recited in claim 2, wherein solving the linear programming problem comprises:
determining the payback period associated with replacement of the at least one first link of the radio access network with the at least one first wireless link at least partially based on the linear programming model of the radio access network.

7. The method, as recited in claim 6, further comprising:
configuring an output device of the computer system to indicate the selection,
wherein configuring the output terminal comprises indicating a payback period associated with a radio access network configured with the at least one first wireless link.

8. The method, as recited in claim 2, further comprising:
configuring an output device of the computer system to indicate the selection,
wherein configuring the output terminal comprises displaying a map of the radio access network indicating the one or more first wireless links of the radio access network.

9. The method, as recited in claim 2, wherein solving the linear programming problem comprises:
selecting at least one second link of the radio access network including the at least one first wireless link at least partially based on an updated linear programming model of the radio access network including the at least one first wireless link,
wherein the cellular site is connected by the at least one first wireless link and is a hub location coupled to the at least one second wireless link.

10. The method, as recited in claim 1, wherein the at least one first wireless link is a broadband wireless link having a frequency range in a microwave frequency band.

11. A radio access network designed by the method of claim 1.

12. An apparatus comprising:
a computer program product encoded in one or more non-transitory computer-readable media, the computer program product comprising:
a first sequence of instructions executable to select at least one first link of a radio access network of links between a cellular site and a core network to be at least one first wireless link at least partially based on a linear programming model of the radio access network and a payback period associated with replacement of the at least one first link with the at least one first wireless link,
wherein the selection is at least partially based on the payback period associated with replacement of the at least one first link of the radio access network with the at least one first wireless link and a target payback period.

13. The apparatus, as recited in claim 12, wherein the computer program product further comprises:
a display sequence of instructions executable to configure an output device of a computer system to indicate the selection of the first sequence of instructions.

14. The apparatus, as recited in claim 12, wherein the linear programming model of the radio access network includes a linear objective function of costs associated with links coupling cellular sites in the radio access network and costs associated with wireless links in the radio access network.

15. The apparatus, as recited in claim 14, wherein the linear programming model of the radio access network includes radio access network constraints including one or more of a redundancy requirement, a limit to a number of hops between a cellular site and a hub, a limit to a number of wireless links per hub, and a limit to a number of wireless links per tower.

16. The apparatus, as recited in claim 12,
wherein the first sequence of instructions is executable to determine a minimum cost of operating the radio access network over a target time period by determining a minimum of the linear objective function subject to radio access network constraints,
wherein the selecting the at least the first link is based on the minimum of the linear objective function.

17. The apparatus, as recited in claim 12,
wherein the first sequence of instructions is executable to determine a payback period associated with replacement of the at least one first link of the radio access network with the at least one first wireless link at least partially based on the linear programming model of the radio access network,
wherein the at least one first link is selected based on the associated payback period.

18. The apparatus, as recited in claim 13, wherein the display sequence of instructions is executable to indicate a payback period associated with a radio access network configured with the at least one first wireless link.

19. The apparatus, as recited in claim 13, wherein the display sequence of instructions is executable to display a map of the radio access network indicating the one or more first wireless links of the radio access network.

20. The apparatus, as recited in claim 12,
wherein the first sequence of instructions is executable to select at least one second link of the radio access network including the at least one first wireless link at least partially based on an updated linear programming model of the radio access network including the at least one first wireless link, wherein the cellular site is coupled by the at least one first wireless link and is a hub location coupled to the at least one second wireless link.

21. The apparatus of claim 12, wherein the one or more non-transitory computer-readable media are selected from the set of a disk, tape or other magnetic, optical or electronic storage medium.

22. The apparatus, as recited in claim 12, further comprising:
a user interface;
a display;
a memory system including the computer program product; and
a processor configured to execute the first computer program product,
wherein the processor is configured to execute instructions of the non-transitory computer-readable medium.

* * * * *